United States Patent
Campana

(10) Patent No.: US 12,017,593 B2
(45) Date of Patent: Jun. 25, 2024

(54) MULTIMODAL VEHICLE

(71) Applicants: Ludovico Campana, Campello sul Clitunno (IT); Sergio Pininfarina, Moncalieri (IT)

(72) Inventor: Ludovico Campana, Campello sul Clitunno (IT)

(73) Assignee: Sergio Pininfarina, Moncalieri (IT)

( * ) Notice: Subject to any disclaimer, the term of this patent is extended or adjusted under 35 U.S.C. 154(b) by 514 days.

(21) Appl. No.: 16/614,695

(22) PCT Filed: May 18, 2018

(86) PCT No.: PCT/IB2018/053516
§ 371 (c)(1),
(2) Date: Nov. 18, 2019

(87) PCT Pub. No.: WO2018/211468
PCT Pub. Date: Nov. 22, 2018

(65) Prior Publication Data
US 2020/0122659 A1    Apr. 23, 2020

(30) Foreign Application Priority Data

May 19, 2017    (IT) .......................... 102017000054547

(51) Int. Cl.
*B60R 16/03*        (2006.01)
*B60N 2/015*        (2006.01)
(Continued)

(52) U.S. Cl.
CPC .............. *B60R 16/03* (2013.01); *B60N 2/015* (2013.01); *H04W 4/44* (2018.02); *H04L 67/12* (2013.01)

(58) Field of Classification Search
None
See application file for complete search history.

(56) References Cited

U.S. PATENT DOCUMENTS 5,890,779 A    4/1999 Blackburn et al.
6,278,676 B1    8/2001 Anderson et al.
(Continued)

FOREIGN PATENT DOCUMENTS

CN         103635346 A    3/2014
DE      102006004742 A    9/2007
(Continued)

OTHER PUBLICATIONS

International Search Report and Written Opinion from International Application No. PCT/IB2018/053516, mailed Sep. 19, 2018.
(Continued)

*Primary Examiner* — Adam D Tissot
*Assistant Examiner* — Garrett F Evans
(74) *Attorney, Agent, or Firm* — Merchant & Gould P.C.

(57) ABSTRACT

A multimodal vehicle can be configured according to the reference market and according to the user's needs, whether for shared or private use. The Multimodal Vehicle is created by a multimodal plug known as a TUC. The plug allows anchoring, with the utmost safety, the vehicle's on-board experiences inside the vehicle itself. Thanks to this system, it is possible to create a multimodal/modular platform, which can be configured in different dimensions. The platform provides available space wherein the user can move freely and insert, through the plug, the components that will make up the vehicle's interior, such as seats, dashboard, etc.

12 Claims, 8 Drawing Sheets

(51) Int. Cl.
    *H04L 67/12*    (2022.01)
    *H04W 4/44*    (2018.01)

(56) References Cited

U.S. PATENT DOCUMENTS

| | | | |
|---|---|---|---|
| 7,600,599 | B1 | 10/2009 | Dah et al. |
| 2009/0014584 | A1* | 1/2009 | Rudduck ............. B60N 2/0725 |
| | | | 244/118.6 |
| 2016/0264021 | A1* | 9/2016 | Gillett .................... B60K 35/10 |

FOREIGN PATENT DOCUMENTS

| | | |
|---|---|---|
| DE | 102015119551 A1 | 5/2017 |
| EP | 1839956 A2 | 10/2007 |
| EP | 2754610 A2 | 7/2014 |
| FR | 3018495 A1 | 9/2015 |
| WO | 2011/140551 A1 | 11/2011 |
| WO | 2015/161384 A1 | 10/2015 |

OTHER PUBLICATIONS

International Preliminary Report on Patentability from International Application No. PCT/IB2018/053516, mailed Apr. 11, 2019.

* cited by examiner

TUC system control unit

The TUC system can be arranged anywhere within the three-dimensional space

MULTIMODAL VEHICLE

This application is a National Stage Application of International Application No. PCT/IB2018/053516, filed May 18, 2018, which claims benefit of Serial No. 10-2017-000054547, filed May 19, 2017 in Italy and which applications are incorporated herein by reference. To the extent appropriate, a claim of priority is made to each of the above-disclosed applications.

TECHNICAL FIELD

The present invention relates to the field of vehicles.

BACKGROUND ART

Modern automobiles are a fixed product that does not allow adapting the interior space to the user's requirements. The vehicle is in a solid state, i.e. everything is fixed and irremovable, and the interior components are not designed to allow any changes by the user. This typology of "solid" architecture does not permit fulfilling the different modes of transport currently required by the users (e.g. shared or private). At present, shared transport is effected by means of cars designed for private use but made available to a collectivity. Such a solution does not meet the need for fast, dynamic and varied urban mobility, in that it only dwells upon the mere concession to anyone to gain access to a private means of transport, without however fulfilling the actual definition of shared transport, which requires flexibility, multimodality and efficiency. Private transport is limited to allowing the use of an owned product, which is also fixed and cannot be adapted to the different possible uses thereof by the user.

It is also necessary, due to the increasing time span being spent by the users inside vehicles, to find a solution for optimizing such time at best. In such an instantaneous society, compelling the user to drive only is seen as a social inconvenience as well as a waste of time. Thanks to technological progress and to the development of autonomous driver assistance systems and active/passive safety systems, it is now possible to delegate the task of safely moving the vehicle to such technology, while giving the user the possibility of using the space and the time spent inside the vehicle in a productive manner or for other desired activities.

SUMMARY OF THE INVENTION

It is one object of the present invention to provide a vehicle that can solve this and other problems of the prior art. In particular, it is one object of the present invention to provide a multimodal vehicle of the type described above, which can be configured according to the reference market and to the user's requirements, whether for shared or private use. The invention of the TUC SYSTEM, i.e. the multimodal plug, provides a remedy for the above-described inconveniences in a most efficient manner. Thanks to the TUC SYSTEM, the composition of the interior compartment is considerably simplified and improved, without adversely affecting the functionalities of the vehicle and while adding numerous options aimed at solving the problems currently existing in the world of automobiles. The TUC system allows the users to configure the interior space according to their needs. This means that it will be possible, from time to time, to prearrange, position, optimize and update the interior space of the vehicle by inserting those components that meet the user's current needs, without limiting the travelling experience to driving alone. The user will be able to configure the vehicle for manual or autonomous driving, so that driving will be a specifically chosen, as opposed to mandatory, user experience. According to the above-described invention, this object is achieved through the fact that the multimodal plug and the modular/multimodal platform derived therefrom have only one style of fastener that allows anchoring different elements constituting the internal experience of the vehicle.

According to the present invention, this and other objects are achieved through a vehicle.

It is to be understood that the appended claims are an integral part of the technical teachings provided in the following detailed description of the invention. In particular, the appended dependent claims define some preferred embodiments of the present invention, which include some optional technical features.

BRIEF DESCRIPTION OF THE DRAWINGS

Further features and advantages of the present invention will become apparent from the following detailed description, which is supplied merely by way of non-limiting example with reference to the annexed drawings, wherein.

DETAILED DESCRIPTION OF THE INVENTION

The present invention relates to a multimodal vehicle having an architecture designed for change. This type of vehicle can be configured, both externally and internally, according to the purpose of use thereof, the reference market, and the customer's preferences. It is thus possible to vary the configuration and layout of the multimodal vehicle.

The Multimodal Vehicle is composed as follows: a chassis having a structural function, to which the power unit, the battery pack, the vehicle management systems, the braking system, the damping system, 4 wheels are anchored, everything being arranged attentively to ensure linearity of the floor, which is flat and clear so that it can receive a Multimodal Plug (FIGS. 1, 1a, 1b, 1c, 3), or a set thereof, which, when anchored to the structural chassis, form a multimodal and modular platform whereon different elements can be safely anchored (e.g.: seat, dashboard, control panel, etc.). The multimodal plug(s) may also be arranged anywhere within the three-dimensional space of the multimodal vehicle (FIGS. 5, 5A).

The MULTIMODAL PLUG, hereafter referred to as "TUC", is a multimodal plug which can form a base for safe anchoring of the elements that constitute the vehicle's on-board experience (FIGS. 2, 2A, 2B, 2C, 2D, 2E) and which can exchange information with them; in fact, in addition to providing structural anchorage, "TUC" ensures power flow and data transfer, including Audio/Video and control signals, between the control unit of the "TUC SYSTEM" and the object plugged therein (FIGS. 3A, 3B, 4, 4A).

Figure 1:
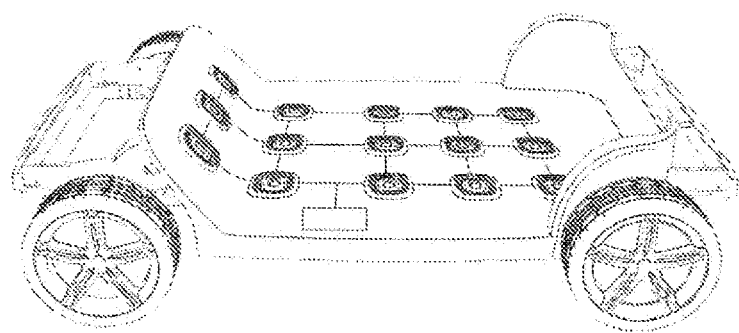
FIG. 1 shows the platform of the multimodal vehicle with integrated TUC system, as well as the connection between one plug and another and the connection to a control unit of the system.
Figure 1A:
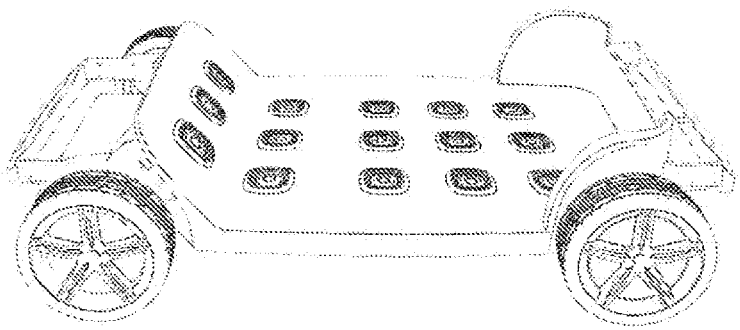
FIGS. 1a, 1b, 1c schematically show a multimodal vehicle according to the invention with three respective configurations of the TUC system, and hence of the multimodal vehicle platform.
Figure 1B:
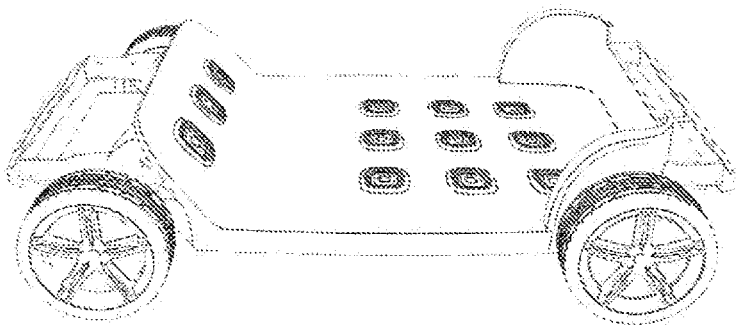
Figure 1C:
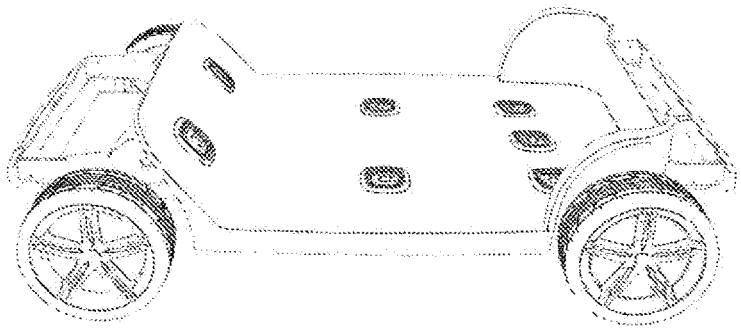
Figure 2:
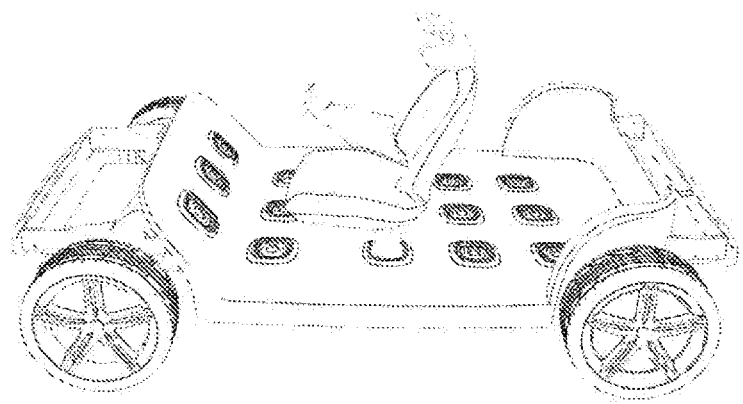
FIGS. 2, 2a, 2b, 2c, 2d, 2e show some configurations of the multimodal platform made possible by the TUC system.
Figure 2A:
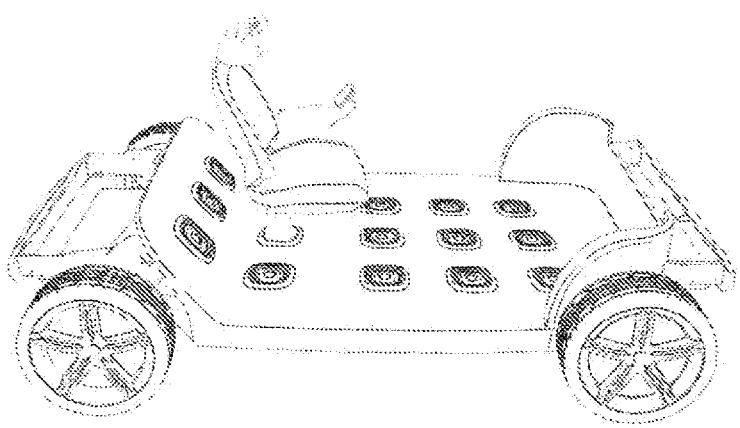
Figure 2B:
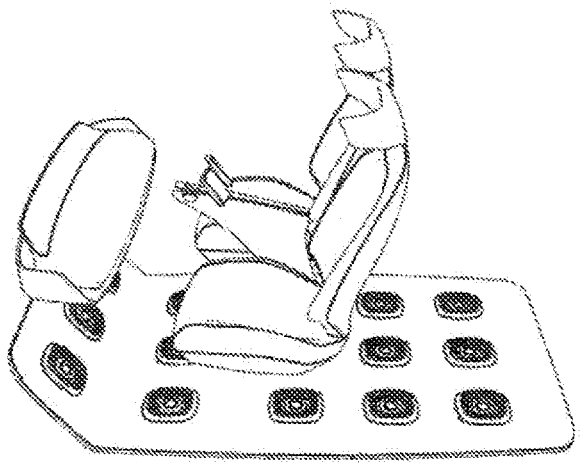
Figure 2C:
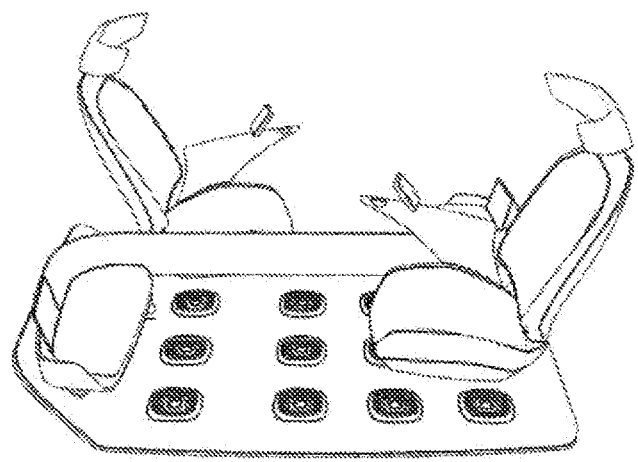
Figure 2D:
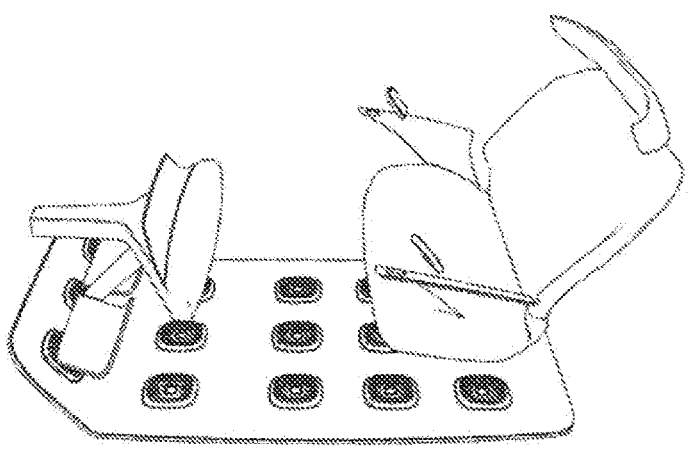
Figure 2E:
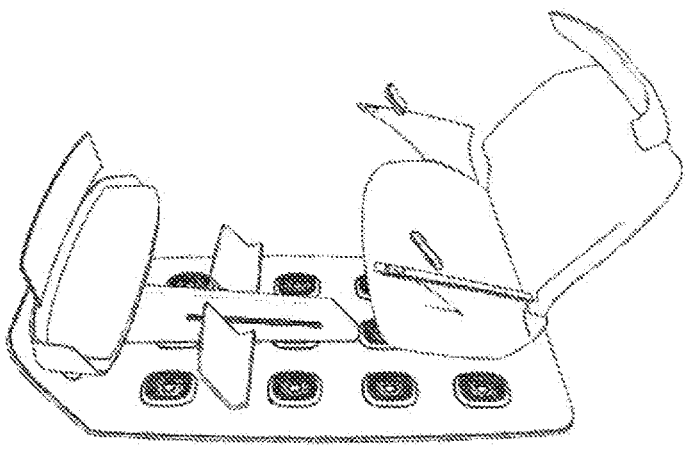
Figure 3:
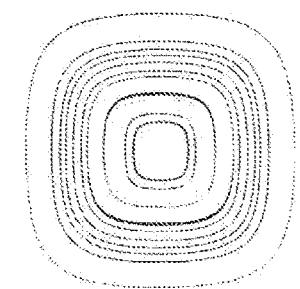
FIG. 3 shows three views of the TUC plug, wherein one can see the shape, the fixing points and the electronics thereof.
Figure 3A:
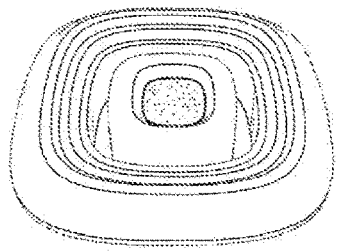
FIGS. 3A and 3B show the different steps of plugging in and, in the reverse order, unplugging a component of the interior experience in the multimodal TUC plug.
Figure 3A:
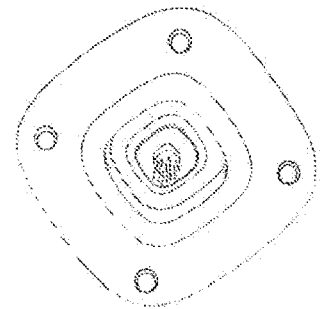
Figure 3B:
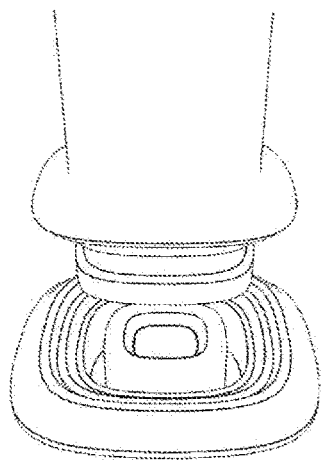
Figure 3B:
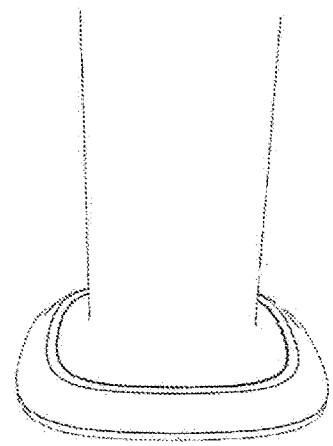
Figure 3B:
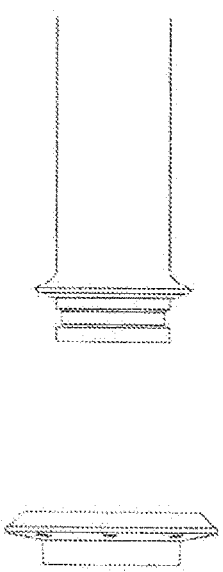
Figure 3B:
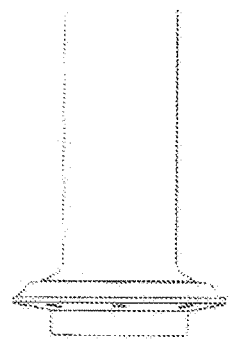
Figure 4:
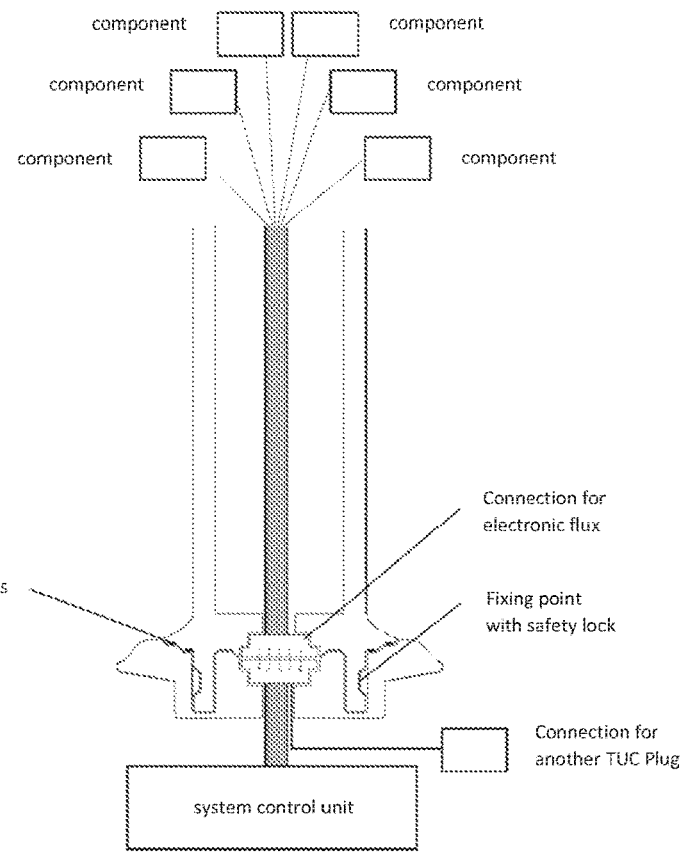
FIGS. 4 and 6 schematically show a section of the multimodal TUC plug, wherein one can understand the structures, the characteristic elements and the operation thereof.
Figure 4A:
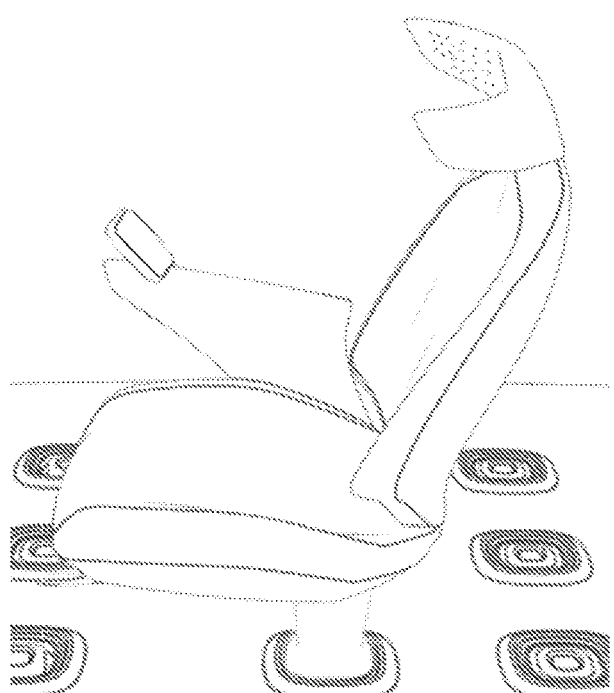
FIG. 4A shows one of the components that can be anchored to the TUC system, in this case a seat, wherein, thanks to the multimodality of the TUC system, it is possible to integrate different types of integrated components, in this case the vehicle control panel in the armrest and the loudspeakers in the headrest, which are connected, through the TUC system, to the vehicle and to the electronic sources.
Figure 5:
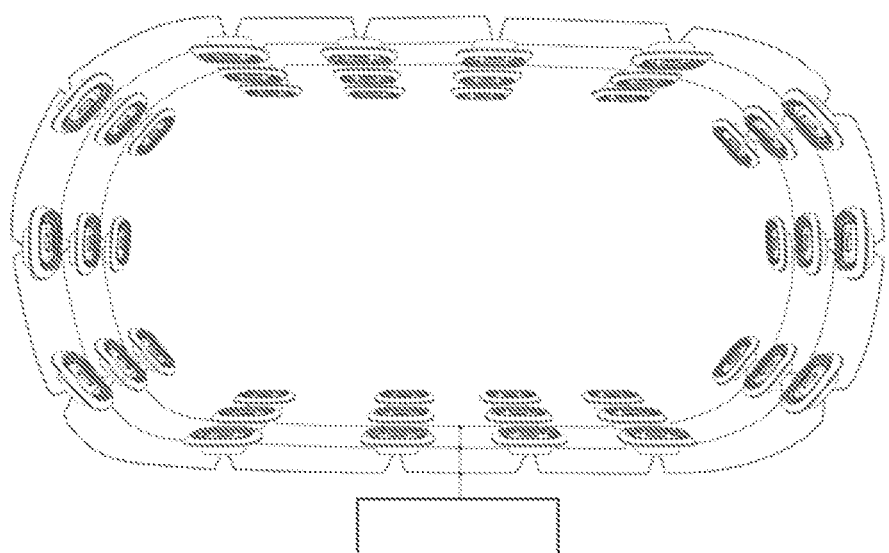
FIGS. 5 and 5A clearly show that the TUC system with the multimodal PLUG can be arranged anywhere within the three-dimensional space of the multimodal vehicle.
Figure 5A:
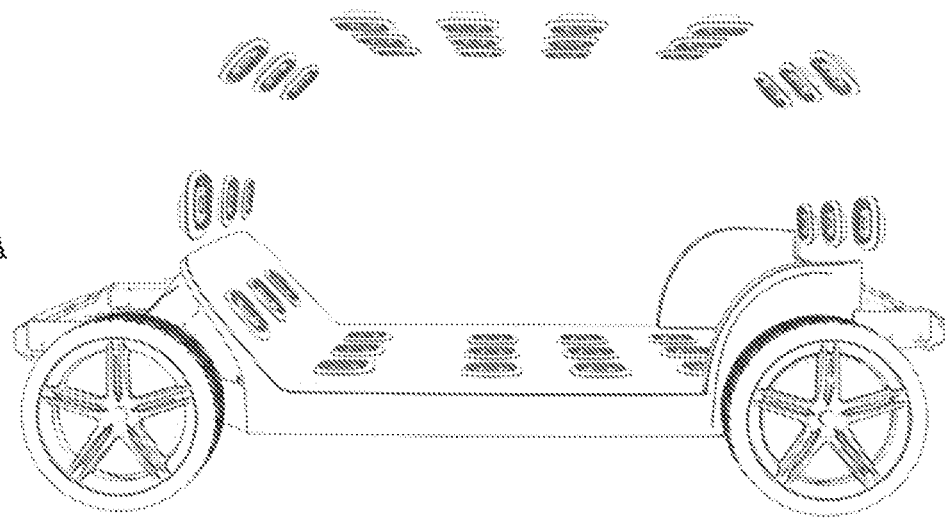
Figure 6:
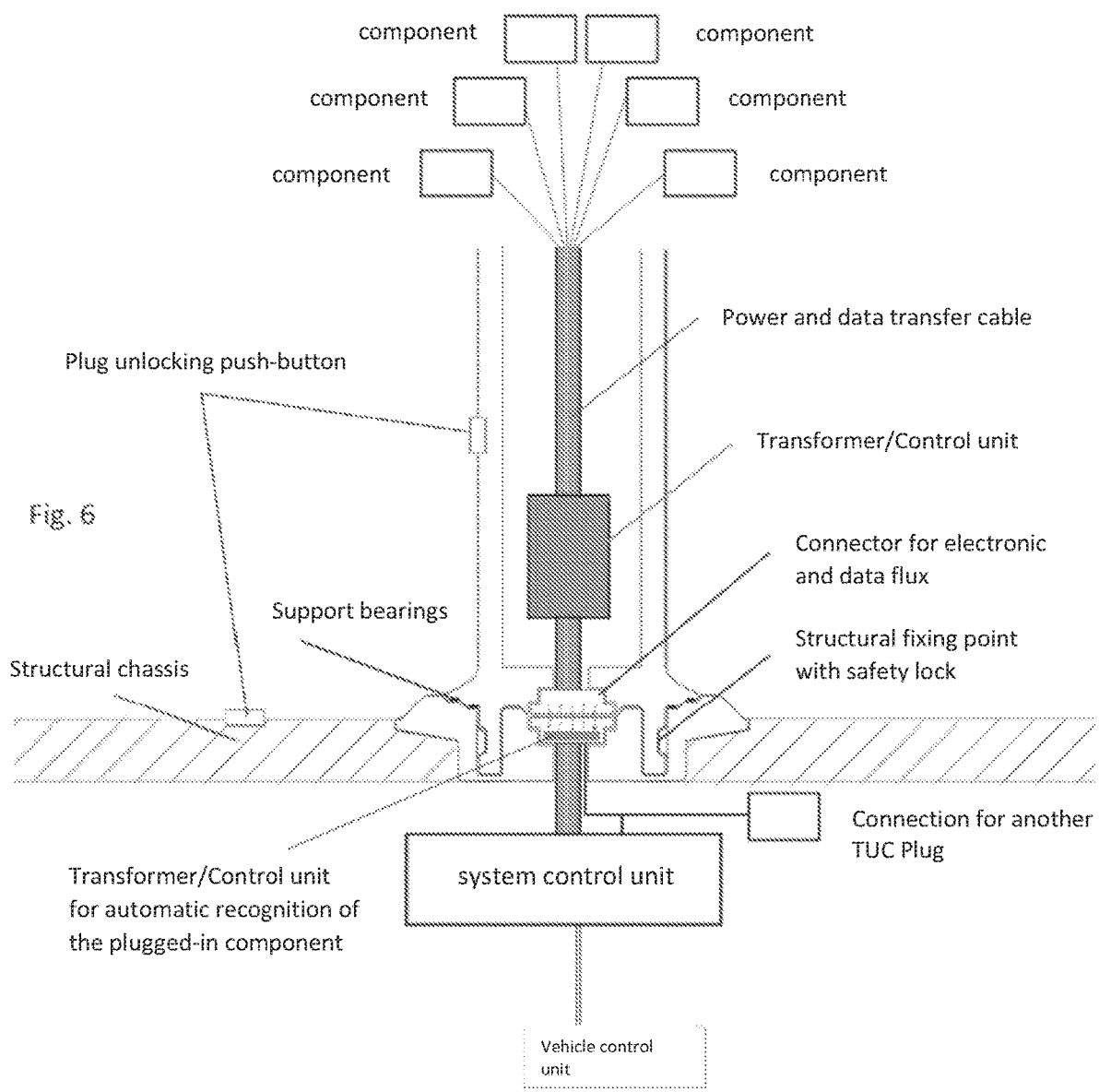

The "TUC SYSTEM" is managed by a control unit powered by the vehicle's electric system (FIGS. 1, 4, 5). One part thereof serves to manage the electronic flows (power supply to the TUC system, Audio/Video transmission, transfer of data and control signals), while the other part of the control unit is assigned to management/reception/provision of Internet connectivity (cellular and Wi-Fi network) and Bluetooth connectivity (short, medium and long range) to allow communication and data transmission with telematic infrastructures connected to the network.

A good example useful for a better understanding of the TUC system is an element (FIG. 4A) with integrated controls; TUC secures it to the vehicle's floor and ensures that power, Audio/Video signals, signals emitted by seat-integrated controls and data transfer streams will flow therethrough.

TUC is the basic element of the multimodal vehicle, into which new experiences and customizations can be plugged in (FIGS. 2B, 2C, 2D, 2E), which, thanks to the TUC system, can be introduced into this new category of multimodal vehicles.

The multimodal vehicle with the Tuc system has been conceived to grant private space in mass mobility, and this is accomplished by means of a multimodal plug called Tuc. The plug allows anchoring, with the utmost safety, the vehicle's on-board experiences inside the vehicle itself. Thanks to this system, it is possible to create a multimodal platform, which can be configured in different dimensions. The platform provides available space wherein the user can move freely and insert, through the multimodal plug, the components that will make up the vehicle's interior (seat, dashboard, control panel, etc.), while also offering the opportunity to house experiences specially developed for the multimodal plug. The space within the vehicle can be set up for a single driver in the center, on the right or on the left, or for multiple drivers, as chosen by the user configuring the interior space of the vehicle.

The vehicle according to the invention may be a motor vehicle (whether a vehicle with an internal combustion engine, a hybrid vehicle or a fully electric vehicle), such as a car, a train, a boat or an aircraft, or another means of transport already known or conceivable in the future.

In particular, the multimodal plug comprises a plug or a socket mounted to the vehicle, in particular inside the vehicle, or to a portion of the vehicle, preferably to the floor. The element to be anchored to the vehicle (e.g. the seat, the dashboard, the control panel, or another specially developed component) comprises a socket or a plug adapted to connect to a respective plug or socket on the vehicle. A plurality or plugs or sockets are installed on the vehicle. Preferably, sockets are mounted to the vehicle, and the components have respective plugs. The plug and the socket thus create a male/female system. The plug and the socket ensure both a structural constraint and a connection for data transmission. Conveniently, the connection allows electricity to flow, so that the plug/socket system can also supply power to the components.

Figure 7:
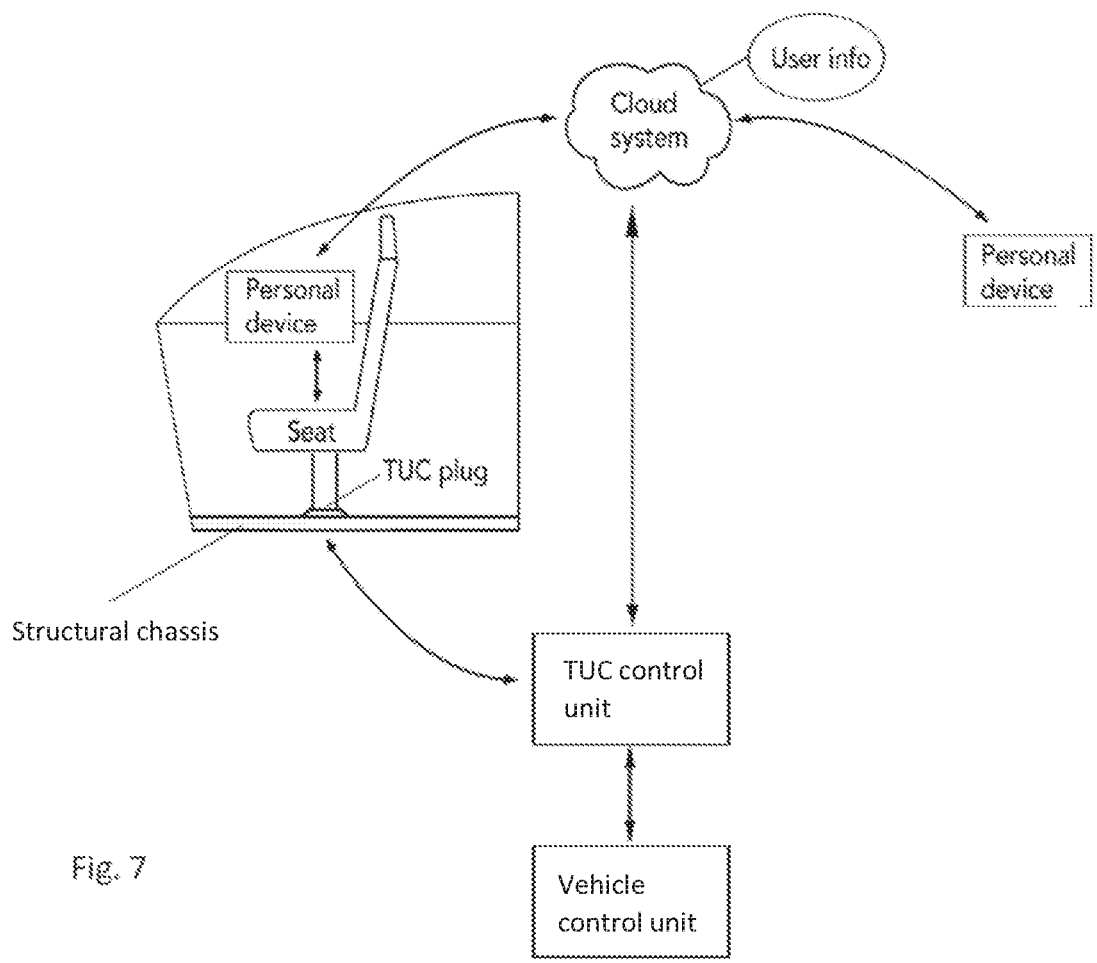
FIG. 7 is a system diagram.

For example, the elements mounted on the vehicle by means of the multimodal plugs may be connected through the control unit, so that they can communicate with one another. An element (e.g. the seat) conveniently has an interface, such as a screen (conveniently, a touchscreen), so as to be able to exchange signals with the control unit. For example, through the interface the user can interact with other vehicle users (e.g. through other elements provided with an interface, or through electronic devices such as smartphones, personal computers, etc.). Optionally, via the interface the user can gain access to electronic mail, browse through the Internet, etc. Moreover, the screen may optionally be able to provide information concerning the status of the vehicle, the trip, traffic, etc., received from the control unit. The element (e.g. the seat) may comprise an electronic device configured for operating as described above. Conveniently, the control unit can interact with other electronic units of the vehicle. Optionally, the control unit can operationally connect to a remote memory unit or a remote server (e.g. a "cloud"), e.g. through a dedicated application for electronic devices (e.g. smartphones or tablets). Optionally, the element (e.g. seat) is adapted to connect, e.g. in wireless mode, the control unit to at least one portable electronic device of a user (e.g. PC, smartphone, tablet) and/or to connect portable electronic devices of several users to one another (FIG. 7). For example, the control unit may be able to send information to the portable electronic device in order to show it to the user, or may be able to receive commands from said portable device in order to control the vehicle (e.g. to operate the windows, to adjust the seats, to adjust the climate control system or to control the radio, etc.).

Further technical features not described in detail herein can be easily inferred by a person skilled in the art in the light of the present description and of the drawings.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A multimodal vehicle having an architecture to configure and vary a layout of the multimodal vehicle; wherein the vehicle comprises a multimodal plug configured to anchor and exchange information with an element plugged into the multimodal plug;
   wherein the element plugged into multimodal plug facilitates an on-board experience for a user of the vehicle, and wherein the multimodal plug provides structural anchorage and ensures power flow and data transfer, including Audio/Video and control signals, between a control unit and an element plugged into the multimodal plug;
   wherein the multimodal plug is configured for anchoring a dashboard; and wherein the dashboard is anchored to the multimodal plug.

2. The multimodal vehicle according to claim 1, wherein the control unite is powered by an electric system of the vehicle, and wherein the multimodal plug is managed by the control unit;
   a part of the control unit manages electric flows, and another part of the control unit is assigned to management/reception/provision of Internet and open wireless connectivity to allow communication and data transmission with telematic infrastructures connected to a network.

3. The multimodal vehicle according to claim 2, wherein the electric flows include: power supply, Audio/Video transmission, data and control signal transfer; and Internet connectivity provided over cellular or wireless internet connection network.

4. The multimodal vehicle according to claim 1, comprising:
   a chassis having a structural function, whereon power units and vehicle management systems are anchored, the chassis, power units and vehicle management systems being arranged to ensure linearity of a floor, which is flat and clear, wherein the floor receives a multimodal plug, or a set thereof, which, when anchored to the structural chassis, form a multimodal and modular platform whereon different elements are anchored.

5. The multimodal vehicle according to claim 1, wherein the multimodal plug is configured to anchor the element inside the vehicle; and enables creating a multimodal platform, which is configurable in different dimensions;
   the multimodal platform is configured to provide available space wherein a user is free to move and insert through the multimodal plug, components within the vehicle's interior, while allowing the vehicle to house user experiences specially developed for the multimodal plug.

6. A multimodal plug configured to anchor and exchange information with an element plugged into the multimodal plug; wherein the multimodal plug provides structural anchorage and ensures power flow and data transfer, including Audio/Video and control signals, between a control unit and the element plugged into the multimodal plug;
   wherein the element plugged into the multimodal plug facilitates an on-board experience for a user of the vehicle; and
   wherein the multimodal plug is configured for anchoring a dashboard.

7. The multimodal plug according to claim 6, wherein:
   the control unit is powered by an electric system of the vehicle;
   the multimodal plug is managed by the control unit;
   a part of the control unit manages electric flows, and another part of the control unit is assigned to management/reception/provision of Internet and open wireless connectivity to allow communication and data transmission with telematic infrastructures connected to a network.

8. The multimodal plug according to claim 6, wherein the electric flows include: power supply, Audio/Video transmission, data and control signal transfer; and Internet connectivity provided over cellular or wireless internet connection network.

9. The multimodal vehicle according to claim 1, comprising a plurality of the multimodal plugs.

10. The multimodal vehicle according to claim 1, further comprising an element to be anchored by the multimodal plug, wherein the element is adapted to connect the control unit to at least one portable electronic device of a user and/or to connect portable electronic devices of a plurality of users to one another.

11. The multimodal vehicle according to claim 1, wherein the control unit is configured for operationally connecting to a remote memory unit or a remote server through a dedicated application for electronic devices.

12. The multimodal vehicle according to claim 1, wherein the control unit is configured for receiving commands from a portable electronic device to control the vehicle.

* * * * *